United States Patent [19]

Fujiwara et al.

[11] 4,067,780

[45] Jan. 10, 1978

[54] IMAGE RECORDING MEMBER

[75] Inventors: Takutoshi Fujiwara, Tokyo; Katsuhiko Nishide, Yokohama, both of Japan

[73] Assignee: Canon Kabushiki Kaisha, Japan

[21] Appl. No.: 598,144

[22] Filed: July 23, 1975

[30] Foreign Application Priority Data

| | | |
|---|---|---|
| July 27, 1974 | Japan | 49-86380 |
| Feb. 8, 1975 | Japan | 50-16480 |

[51] Int. Cl.$^2$ ...................... G01D 15/06; G01D 15/10; G01D 15/34

[52] U.S. Cl. ........................................ 204/2; 346/135; 427/150

[58] Field of Search ...................... 204/2; 96/1.5, 1 E; 427/121, 126, 146, 148, 150, 145; 346/76 R, 135, 74 E, 77 R, 77 E; 428/332

[56] References Cited

U.S. PATENT DOCUMENTS

| | | | |
|---|---|---|---|
| 3,138,547 | 6/1964 | Clark | 346/135 |
| 3,411,948 | 11/1968 | Reis | 204/2 |
| 3,514,325 | 5/1970 | Davis et al. | 346/135 |
| 3,713,996 | 1/1973 | Letter | 204/2 |

*Primary Examiner*—T. M. Tufariello

*Attorney, Agent, or Firm*—Fitzpatrick, Cella, Harper & Scinto

[57] ABSTRACT

An image recording member comprises a recording layer composed of a substrate, a thin metal layer and another layer composed of a substance mainly exhibiting the ionic conduction and a binding material.

26 Claims, 3 Drawing Figures

IMAGE RECORDING MEMBER

BACKGROUND OF THE INVENTION

1. Field of the Invention

This invention relates to an image recording member for recording image by application of electric current thereto, which are usable in various recording methods such as those receiving signals of facsimiles, outputs of computer and its terminal equipments, and various kinds of data of measuring apparatuses for industrial, medicinal, business and other purposes.

2. Description of Prior Arts

Recording of electrical signals as an image has been increasing year by year with development in the facsimile and other telecommunication facilities. The methods which have so far been adopted most widely for such recording purposes may be represented by electrical discharge recording, electrolytic recording, and so forth.

The electrical discharge recording method is to form an image either by placing a white pigment layer on an electrically conductive black layer, or by placing an electrically conductive thin metal layer such as, for example, aluminum on the abovementioned electrically conductive black layer, and then by perforating the surface layer of the white pigment or the thin metal layer by electrical discharge of a recording needle (hereinafter referred to as "stylus") so as to remove the surface layer and to expose the black layer underneath thereof.

On the other hand, the electrolytic recording method is to form an image by first impregnating a sheet of paper with an electrolytic solution to bring the same into a wet state, and then causing electric current to flow therethrough by way of the stylus. The resulting image is either a colored substance formed by reaction between the ionized stylus metal and the electrolyte, or a colored decomposition product formed by electrolysis of the electrolyte impregnated in the paper by electric current caused to flow therethrough from the stylus.

According to the electric discharge recording method, as the surface layer is perforated by heat of electric discharge generated by the stylus, there inevitably take place various inconveniences such that a very strong irritating odor comes out, dust from perforation of the surface layer scatters, wear and tear of the stylus is considerable, and other disadvantages. Moreover, mechanical forces such as folding, pressure adhesion, etc. to be imparted to the laminated layers are liable to expose the black layer with the consequence that the paper becomes easily stained. In other aspect, since the surface layer is made so thin to facilitate the electric discharge, the black layer beneath the surface layer cannot be masked perfectly; which is liable to caused the base color of the recording paper to become greyish rather than white, thereby reducing the outer appearance or quality of the paper as a product.

On the other hand, since the electrolytic recording method is of wet type, the recording paper is inferior in its preservability. Also, the quality of the image formed thereon is deteriorated by running of the electrolyte. In addition, the paper undergoes deformation such as wrinkles formed on its surface due to drying after the image recording. These disadvantages are fatal to such wet type recording method.

Also, in Japanese Patent Publication Nos. 22341/1963 and 29630/1969, there is proposed a dry type electrosensitive recording sheet, wherein an image is obtained by dispersing metal compounds capable of being electrically reduced into a free metal in an insulative resin, followed by reduction of the metal compounds into free metals through conduction of electric current. In this electrosensitive recording sheet, however, most of the metal compounds of relatively high electric conductivity are colored, and less-colored metal compounds are of low electric conductivity. The latter require special chemical and physical treatments for the electric current to be conducted therethrough. However, such treatments bring about coloration of the metal compounds with the consequent increase in density of the base color of the recording sheet to a considerable degree. Moreover, difficulty in electric conduction through the insulative resin dispersion causes issuance of an undesirably bad smell due to heat from the electric discharge at the time of recording, considerable degree of wear and tear in the stylus, and other defects.

Furthermore, Japanese Patent Publication No. 5476/1967 and No. 13239/1967 disclose a method, wherein an electrically conductive thin layer is formed on a white or transparent substance such as silica, and so on by means of evaporative deposition, after which the substance is dispersed in a matrix for electric conduction. However, even this method requires a considerable degree of skills and facility.

As stated above, therefore, the conventional image recording methods posed various problems in forming images on the recording member in view of the lack of an image recording member capable of effectively carrying out the image formation by electric conduction in the dry type recording technique.

SUMMARY OF THE INVENTION

With the afore-described problems inherent in the heretofore known method for image recording in mind, it is the main object of the present invention to provide an image recording member which is capable of recording an image directly thereon with high resolution by application of electric current through a stylus impressed with an electric voltage, electron beam irradiation, and so forth, and without requiring a separate step for developing the same.

It is another object of the present invention to provide the image recording member which is simple in its structure, and easy to handle at the time of its production.

It is still another object of the present invention to provide the image recording member which apparently maintains a perfectly dry condition, and exhibits stabilized recordability at both high and low humidity conditions.

It is a further object of the present invention to provide the image recording member which can respond to very small variations in amount of electric conduction, and is excellent in reproducing of the tone of the original image.

It is a still further object of the present invention to provide the image recording member having a high degree of whiteness in its background as the recording material and smooth to the touch.

It is other object of the present invention to provide an image recording member which has excellent stability.

It is still other object of the present invention to provide an image recording member which produces images having excellent resistant properties against light, temperature, and humidity.

It is an additional object of the present invention to provide a method for image recording which is capable of recording an image directly thereon with a high resolution by application of electric current therethrough by means of a stylus impressed with an electric voltage, electron beam irradiation, etc., and without requiring a separate process for the development of the image, being of an apparent dry type.

According to the present invention, in one aspect thereof, there is provided an image recording member having a recording layer composed, in an appropriate laminar form, of a substrate, a thin layer of a metal substance, and another layer formed of a substance mainly exhibiting ionic conduction and a binding material.

According to the present invention, in another aspect thereof, there is provided an image recording method by electric conduction which comprises applying electric current through an image recording member having a recording layer consisting of laminated layers of a substrate, a thin metal layer, and another layer formed of substrate mainly exhibiting ionic conduction and a binding material.

The foregoing objects as well as details of the construction and functions of the present invention will become more clearly understandable from the following description thereof, when read in conjunction with the accompanying drawing and several preferred examples which illustrate reduction to practice.

DESCRIPTION OF THE PREFERRED EMBODIMENTS

Figure 1:
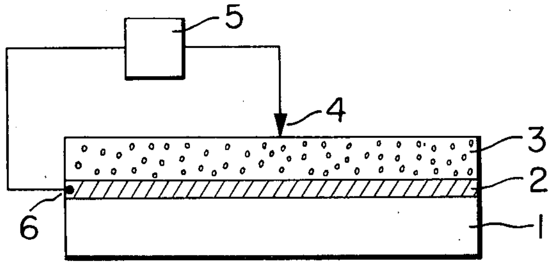
FIGS. 1, 2 and 3 schematically illustrate the structure of the image recording member of the present invention and the recording method.
Figure 2:
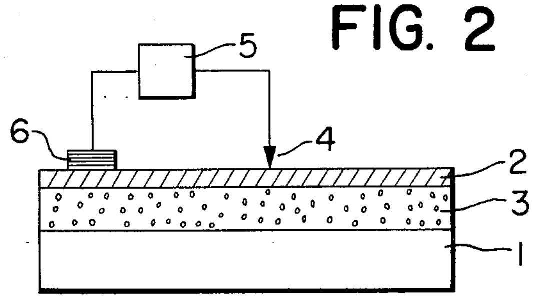

The image recording member according to the present invention comprises a recording layer which is constructed with an arbitrary supporting body or substrate, a thin metal layer, and another layer formed of a substance mainly exhibiting the ionic conduction, and, in some case, with further addition of the oxygen acid of boron, dispersed in a binding material, the two layers being coated on the substrate in laminar form. FIGS. 1 and 2 schematically show exemplary structures of such image recording member.

The image recording member shown in FIGS. 1 and 2 is essentially composed of the following respective layers in the laminated form.

a. Substrate 1: This is made of an arbitrary material either pervious or impervious to light such as for example, paper, resin film, various kinds of glass, metal sheet, and so forth. As will be described in more detail hereinafter, the image to be recorded after application of electric current according to the present invention is generally divided into two types. One type is the so-called color-formed (or colored) image, and a other is the light transmitting image formed on a light impervious background. Thus, when the image recording member of the present invention belongs to the former type, any kind of substrate irrespective of whether it is light-pervious or impervious can be utilized. However, when the image recording member belongs to the latter type, only the light-transmitting substrate such as very thin and high quality paper having high degree of beating, stretch-oriented polypropylene film, polyester film, cellophane, glacine, tracing paper, resin-impregnated paper, and so forth can be used.

b. Thin metal layer 2: This layer is formed by sputtering, vacuum-evaporation, and other appropriate methods of thin film depositing various metals such as aluminum, silver, zinc, copper, nickel, chromium, tungsten, etc. to a film thickness of from 50 to 2,000 angstroms (A), more preferably approximately 500 angstroms (A). As in other methods, powder of those metals is dispersed in a binding material and applied onto the surface of the substrate, or a very thin foil of these metals is adhered onto the substrate. In the present invention, the film formed by the vacuum-evaporation is the most suitable.

c. Layer of compositions 3: This layer is formed of a substance mainly exhibiting the ionic conduction to be described in more detail hereinafter, and, in some case, with addition thereto of the oxygen acid of boron or its salts, or other appropriate additives, dispersed in a binding material. In the present invention, the so-called color developer (coloring agent, or color former) which has been used conventionally may not be used.

The above-described two layers 2 and 3 combined together constitute the recording layer of the present invention. In addition to this recording layer, the following member is necessary to carry out the electric conduction for the image forming.

d. Recording stylus 4: This stylus or needle electrode for image recording for use in applying electric current to the recording layer is connected to a return path electrode 6 by way of an electrical circuit 5. The position of the return path electrode 6 to be set as shown in the drawing is only an example, and is not restricted to the illustration alone.

In the following, the component for constituting each of the afore-described three layers 1, 2, and 3 will be explained in more detail.

A. Substance Mainly Exhibiting the Ionic Conduction

This is a solid material which exhibits primarily the ionic conduction in the vicinity of the normal temperature, and is virtually insoluble in the solvent and binding material to be used. Examples of such substance are as follows.

(A-1 ) Compounds Containing Therein Zeolitic Water

The zeolitic water containing compounds to be used in the present invention is defined to have the following properties.

1. The compound possesses "pores" or "cavities" in its molecular structure, in which a loosely bound water (hereinafter referred to as "zeolitic water") is held. And, even in this state of containing a sufficient amount of the zeolitic water in these pores or cavities, the compound does not exhibit "stickiness" as seen in the hygroscopic and efflorescent phenomena which is generally shown by sodium chloride and like salts, but it maintains an apparent dry state.

2. The compound does not lose its crystal structure, even when the zeolitic water it contains is completely removed under heat, reduced pressure, or any other expedient.

3. The compound, from which the zeolitic water has been completely removed, immediately re-adsorbs water even under a low humidity condition to restore the original saturated state.

4. The compound exhibits good electric conductivity on account of the zeolitic water and various kinds of ions, with which it may co-exist.

As mentioned in the preceding paragraphs, the compound has very unique physical properties, and the present invention has just relied on such properties for their application. That is to say, after strenuous and painstaking studies and experiments, it has been found out that the image recording material produced from a system, in which the compound is uniformly dispersed in a medium, can exhibit the substantially same physical properties as the compound per se. The representative examples of the zeolitic water containing compounds are natural or synthetic zeolites.

The natural zeolites are called aluminosilicate which is represented by the following general formula: $(M^{2+}, 2M^{+}) O.Al_2O_3.mSiO_2.nH_2O$ ($3 \leqq m \leqq 10$), where $M^{2+}$ and $M^{+}$ indicate respectively divalent and monovalent metal ions, most of which are usually $Ca^{2+}$ and $Na^{+}$, and rarely $Sr^{+2}$, $Ba^{+2}$, and $K^{+}$, all being capable of replacing with other cations. These zeolite minerals have specific "cavities" or "pores" in the three dimensional skeleton structure, and the above-mentioned replaceable cations are held in these pores together with water molecules. Besides water, solvents in general can be adsorbed in the cavities. In this case, the solvents of stronger polarity can be selectively and preferentially adsorbed. There exist a great many kinds of synthetic zeolites which have substantially the same three-dimensional skeleton structure as that of the natural zeolite, and which are not much different from the natural zeolite in respect of the basic properties.

Furthermore, there are natural or synthetic compounds which have chemical compositions completely different from the zeolite minerals in spite of their having the same basic properties as zeolite, i. e., they have the cavities, and do not change their structures in absorption and desorption of water. Such compounds are called zeolite-like compounds, which are also useful for the purpose of the present invention.

Zeolites both natural and synthetic which are used in the present invention may be classified for their structure into the following six kinds.

| | |
|---|---|
| (1) Analcite Group: | |
| Analcite | $NaAlSi_2O_6 . H_2O$ |
| Pollucite | $(Cs,Na)AlSi_2O_6 . xH_2O(x < 1.0)$ |
| Viseite | $Ca_{10}Na_2Al_{10}Si_6P_{10}(H_3)_{12}(H_{20})_{16} . O_{96}$ |
| Kehoesite | $Zn_{5.5}Ca_{2.5}Al_{16}P_6(H_3)_{16}(H_2O)_{32}O_{96}$ |
| (2) Sodalite Group: | |
| Hydrosodalite | $Na_8(Al_6Si_6O_{12})(OH)_2$ |
| Faujasite | $Na_{28.6}Ca_{14.8}(Al_{57.6}Si_{134.4}O_{384})$ $.262 . 3H_2O$ |
| Molecular sieve A* | $Na_{12}(Al_{12}Si_{12}O_{24})NaAlO_2 . 29H_2O$ |
| Molecular sieve X* | $Na_2(Al_2Si_{2.8}O_{9.6}) . xH_{20}(x-6)$ |
| Molecular Sieve Y* | $Na_2O . Al_2O_33 \sim 6SiO_2. xH_2O$ |
| Molecular sieve SK* | Substantially same as Faujasite |
| (3) Chabazite Group: | |
| Chabazite | $(Ca . Na_2)Al_2Si_4O_{12} . 6H_2O$ |
| Gmelinite | $(Na_2. Ca)Al_2Si_4O_{12} . 6H_2O$ |
| Erionite | $(Ca . Mg . Na_2 . K_2) . Al_2Si_4O_{12} . 6H_2O$ |
| Levynite | $Ca(Al_2Si_4O_{12}) . 6H_2O$ |
| Molecular sieve R* | Same as Chabazite |
| Molecular sieve S* | Same as Gmelinite |
| Molecular sieve T* | Same as Erionite |
| (4) Natrolite Group: | |
| Natrolite | $Na_2 (Al_2Si_3O_{10}) . 2H_2O$ |
| Mesolite | $Na_2Ca_2 (Al_6Si_9O_{30}) . 8H_2O$ |

-continued

| | |
|---|---|
| Scolecite | $Ca(Al_2Si_3O_{10}) . 3H_2O$ |
| Thomsonite | $NaCa_2(Al_5Si_5O_{20}) . 6H_2O$ |
| Edingtonite | $Ba(Al_2Si_3O_{10}) . 4H_2O$ |
| Gonnardite | $Na_2Ca(Al_4Si_6O_{20}) . 6H_2O$ |
| Rhodesite | $KNaCa_2(H_2Si_8O_{20}) . 5H_2O$ |
| Mountainite | $KNa_2Ca_2(HSi_8O_{20}) . 5H_2O$ |
| (5) Harmotome Group: | |
| Harmotome | $Ba_2(Al_4Si_{12}O_{32}) . 4H_2O$ |
| Phillipsite | $(KxNa_1-x)_5Al_5Si_{11}O_{32} . 10H_2O$ |
| Gismondite | $Ca(Al_2Si_2O_8) . 4H_2P$ |
| Molecular sieve B* | $Na_2(Al_2Si_3O_{10}) .5H_2O$ |
| Garronite | $NaCa_{2.5}(Al_3Si_5O_{10})_2 .135H_2O$ |
| (6) Mordenite Group: | |
| Mordenite | $Na(AlSi_5O_{12}) . 3H_2O$ |
| D'achiardite | $(Na_2Ca)_2Al_4Si_{20}O_{48} . 12H_2O$ |
| Ferrierite | $Na_{1.5}Mg_2(Al_{5.5}Si_{30.3}O_{72}) . 18H_2O$ |
| Zedon** | Same as Mordenite |

Note:
*Synthetic zeolite manufactured by Union Carbide Corp., U.S.A.
**Synthetic zeolite manufactured by Norton Co.

Next, the zeolite minerals of undetermined structure will be enumerated as follows.

| | |
|---|---|
| Heulardite | $Ca(Al_2Si_7O_{18})6H_2O$ |
| Clinoptilotite | $Na_{0.95}K_{0.30}Ca_{0.5}(Al_{1.35}Si_{7.00}O_{18}) . 5H_2O$ |
| Stilbite | $Ca(Al_2Si_7O_{18})7H_2O$ |
| Epistilbite | $Ca(Al_2Si_6O_{16}) . 5H_2O$ |
| Brewsterite | $(Sr, Ba, Ca)Al_2Si_6O_{16} . 5H_2O$ |
| Laumontite | $Ca(AlSi_2O_6) . 4H_2O$ |
| Yugawaralite | $Ca(Al_2Si_5O_{14}) . 3H_2O$ |
| Paulingite | $(K, Ca, Na)_{120} (Al, Si)_{580}O_{1100})690H_2O$ |
| Aschcroftine | $[KNa(Ca, Mg, Mn)]_{120}(Al_{100}Si_{200}O_{720})320H_2O$ |
| Bikitaite | $LiAlSi_2O_6 . H_2O$ |

The above enumerated zeolite minerals are all applicable to the present invention.

In the following, zeolite-like minerals will be listed, which are classified into two major groups.

| | | |
|---|---|---|
| (1) Zeolite-like silicate which is not classified as zeolite, but contains zeolitic water: | | |
| Beryl | $Al_2Be_3[Si_6O_{18}] . nH_2O$ | |
| Cordierite | $Mg_2Al_3[AlSi_5O_{18}] . nH_2O$ | |
| Milarite | $KCa_2AlBe_2[Si_{12}O_{30}] . 0.5H_2O$ | |
| Osumilite | $(K,Na,Ca) (Mg,Fe)_2(Al,Fe)_3[(Si,Ai)_{12}O_{30}] . H_2O$ | |
| Hydrated Nepheline | $KNa_3(Al_4Si_4O_{16}) . nH_2O$ | |
| Cancrinite | $Na_6Ca_6(Al_6Si_6O_{24})CO_3. 3H_2O$ | |
| Buddingtonite | $NH_4AlSi_3O_8. 0.5 H_2O$ | |
| (2) Other zeolite-like minerals: | | |
| (a) | Germanate: | |
| | $M_3[HGe_4(GeO_4)_3O_4] . 4H_2O$ where M is a metal ion. | |
| (b) | Phosphate, Arsenate: | |
| | Scorodite | $FeAsO_4 . 2H_2O$ |
| | Pharmacoside | $K[Fe_4(OH)_4(AsO_4)_3] . 6 \sim 7H_2O$ |
| (c) | Water-containing metal oxide: | |
| | Psilomelane | $(Ba,H_2O)_2, Mn_5O_{10}$ |
| (d) | Three-dimensional complex: | |
| | Prussian blue | $M_3[Fe(CN)_6]_2 . 12H_3O$ where M is Mn, Fe, Co, Ni, Zn, Cd. |
| | Weddellite | $CaC_2O_4 . (2+X)H_2O, (x<0.5)$ |

The above-listed compounds are all applicable for the purpose of the present invention. More preferable are those compounds having large cavity volume, or porosity and a high water content, hence exhibiting good electric conductivity.

(A-2) Solid Electrolyte

Most of the solid electrolytes used for solid electrolytic cells, solid electrolytic elements, electrolytic solid medium, or electrode materials, or else are highly suited for the purpose of the present invention.

Examples of these solid electrolytes are enumerated in the following.

a. Beta-aluminas $A_2O.9\sim11(M_2O_3)$ where A is $Na^+$, $K^+$, $Li^+$, $Rb^+$, $Ag^+$, $Te^+$, $NH_4^+$, $H_3O^+$, etc; and M is Al,Ga,Fe, etc.

b. Silver compounds $MAg_4I_5$ ($M=Rb^+,K^+,NH_4^+$), $Ag_3SI$, $Ag_2Hg_{0.25}S_{0.5}I_{1.5}$, $Ag_{1.8}Hg_{0.46}Se_{0.7}I_{1.3}$, $Ag_{1.85}Hg_{0.40}Te_{1.65}I_{1.35}$, $Ag_7I_4PO_4$, $Ag_5I_3SO_4$, $Ag_{19}I_{15}P_2O_7$, $(CH_3)_4NAg_6I_7$, $C_2H_5N(CH_3)_3Ag_6I_7$, $(C_2H_5)_2N(CH_3)_2Ag_6I_7$, $\alpha$-$Ag_2S$, $\alpha$-$Ag_2Se$, $\alpha$-$Ag_2Te$, $Ag_6I_4WO_4$, $Ag_2HgI_4$, $Ag_2HgI_4$-$Cu_2HgI_4$, $Ag_2Se$-$HgI_2$, AgI-$Ag_2S$-$HgI_2$, $Ag_2S$-$HgI_2$, $Ag_3SBr$, AgI, AgBr, AgCl, etc.

c. Copper compounds $\alpha$-CuBr, $\alpha$-CuSe, $\alpha$-$Cu_2HgI_6$, $\ominus$-$Cu_2HgI_4$, copper halide-complex body of organic compounds (cuprous halide-halogenated NN'-dialkyl-triethylenediamine, cuprous halide-halogenated N-alkylhexamethylenetetramine, etc.), and so on.

d. Chalcogen glasses $Tl_2Se$-$As_2Se_3$, $Tl_2Se$-$As_2Te_3$, As-Te-I, etc.

e. Others

K-Mg-hollandite, beta-spodumene, sodium silicate glass, solid-solutions with $ZrO_2$,$CeO_2$, or $ThO_2$ as the principal component, $La_{1-x}Ca_xAlO_3$, $CaTi_{0.5}Al_{0.5}O_{2.75}$, etc.

(A-3) Ion-Exchange Resins

Synthetic resins which consist principally of porous high polymers containing therein ion-exchangeable acid groups or base groups fall under this category. Types of such ion-exchange resins are cationic ion-exchange resin, anionic ion-exchange resin, and amphoteric ion-exchange resin.

The composition of the high polymer to be the principal constituent of the ion-exchange resin may be any of polystryene amine type, phenol methylene sulfonic acid type, polystyrene sulfonic acid type, phenol formaldehyde polyamine type, methacrylic acid type, and vinyl resins.

The acid groups may, for example, be sulfonic acids group ($SO_3H$), carboxylic acid group (—COOH), and phenolic hydroxy group (—OH), etc. The base groups may, for example, be amino group (—$NH_2$), substituted amino group (—NHR, —NRR'), and quaternary ammonium salt group (—N+RR'R''), etc.

(A-4) Silicates

Silicates are represented generally by the molecular formula $xM_2O.ySiO_2$, which occur in nature in the form of clays. As examples, there are amorphous clays such as allophane, hisingerite, etc., and crystalline phyllosilicate such as montmorillonite group, pyrophyllite group, talc group, mica group, caolin group, chlorite group, vermiculite, and so forth.

(A-5) Others

There are moisture-adsorbing porous substances such as, in particular, diatomaceous earth, silica gel, and so on.

For the purpose of the present invention, it is also effective to use these substances as enumerated in the foregoing long list with inclusion therein of various polar substances other than water, for example, polar solvents such as alcohol, ammonia, dimethyl formamide, and the like, carboxylic acid salts, sulfuric acid derivatives, amines, quaternary ammonium salts, metal complex salts, inorganic salts, anti-static agents such as acrylic acid ester derivatives, vinyl ether derivatives and the like, and surfactants, etc.

B. Oxygen Acid of Boron or Salts Thereof

These are boric acid or borates, the examples of which are as follows.

(B-1) Boric Acids

Ortho-boric acid, meta-boric acid, tetra-boric acid, etc.

(B-2) Borates

These are the compounds represented by the general formula: $xM'_2O.yB_2O_3.zH_2O$ (where M' is a monovalent cation, z is an integer of 0, 1, 2, 3, . . . *n*), which includes ortho-borate ($y/x = \frac{1}{3}$), diborate ($y/x = \frac{1}{2}$), meta-borate ($y/x = 1$), tetra-borate ($y/x = 2$), penta-borate ($y/x = 5/2$), octa-borate ($y/x = 4$), and so on. More concretely, the following compounds are exemplified: zinc borate, sodium borate, hydrogen ammonium borate, potassium borate, hydrogen manganese borate, cadmium borate, barium borate, and so forth.

C. Binding Materials

The binding material as used herein include: natural high polymers such as gelatin, casein, gum arabic, shellac, starch and its degraded products or derivatives, alginic acid and its derivatives; cellulosic derivatives such as cellulose nitrate, carboxymethyl cellulose and so on; semi-synthetic high polymers such as natural rubber plastics such as chlorinated rubber, cyclized rubber, and so on; polymerization type synthetic high polymers such as polyisobutylene, polystyrene, terpene resin, polyacrylic acid and its salts, polyacrylate, polymethacrylate, polyacrylonitrile, polyacrylamide, polyvinyl acetate, polyvinyl alcohol, polyvinyl pyrrolidone, polyacetal resin, polyvinyl chloride, polyvinyl pyridine, polyvinyl carbazole, polybutadiene, butadienestyrene copolymer, butyl rubber, polyoxymethylene, polyethylene imine, polyethylene imine hydrochloride, poly(2-acryloxyethyldimethylsulfonium chloride), copolymer of vinylmethyl ether and maleic anhydride and monoalkyl ester thereof and so forth; polycondensation type high polymers such as phenolic resin, amino resin, toluene resin, alkyd resin, unsaturated polyester resin, allyl resin, polycarbonate, polyamide resin, polyether resin, silicone resin, furan resin, thiokol rubber, and so on; and addition-polymerization type polymers such as polyurethane, polyurea, epoxy resin, and so on. Particularly preferable for the purpose of the present invention are high molecular substances containing in their molecular structure carboxylic acid or its salts, e.g., carboxymethyl cellulose, gum arabic gelatin, sodium alginate and its derivatives, polyacrylic acid and its derivatives, copolymer of methyl vinyl ether and maleic anhydride and its alkyl monoester, and so forth.

Although conductive polymer containing quaternary ammonium salt are also high polymeric electrolytes, they are not desirable on account of their raising various inconveniences such as issuance of bad smell at the time of the recording operation, corrosion of the thin metal layer, and so on.

The image recording member according to the present invention may be manufactured in the following manner. One or two, or more kinds of substances mainly exhibiting the ionic conduction, and, in some case, boric acid or borate, are mixed with a binding material and dispersed in a ball mill, etc. in the presence of an appropriate solvent which is capable of dissolving the binder. In this case, the mixing ratio of the substance mainly exhibiting the ionic conduction (hereinafter abbreviated as "P" for the sake of simplicity in explanation) and the binder (hereinafter abbreviated as "B" for the sake of simplicity in explanation) ranges from P/B = 3/1 to P/B = 15/1 (by weight), or more preferably, from 5/1 to 10/1. Also, the mixing ratio of the substance mainly exhibiting the ionic conduction (P) and the oxygen acid of boron or its salts (hereinafter abbreviated as "A" for the sake of simplicity in explanation) ranges from A/P = 1/20 to A/P = $\frac{1}{4}$ (by weight).

Further, it is preferable that, for the purpose of increasing the degree of whiteness of the recording member using the abovementioned compositions and improving the binding force among these compositions, various metal compound additives such as, for example, titanium oxide, zinc oxide, antimony trioxide, antimony pentoxide, aluminum oxide, stannic oxide, indium oxide, molybdenum oxide, magnesium oxide, zinc hydroxide, bismuth oxide, tantalum pentoxide, and so on. These metal compounds are also effective in color tone adjustment and increasing the image density. The added quantity of these compounds may be arbitrarily selected in conformity to the purpose.

Also effective as the additives for increasing the image density and blackening of the reproduced image according to the present invention is the use of inorganic high molecular weight carbon fluoride.

Inorganic high molecular weight carbon fluoride is an inorganic compound consisting of carbon and fluorine, and, more specifically, is a graphitic laminate compound, and represented by the following general formula: $(C\ F_x)_n$. The compound per se has already been well known. Incidentally, the carbon fluoride having the rate of fluorination of 100%, i.e., having $x = 1$ in the abovementioned general formula, is particularly called "polycarbon monofluoride" which assumes a white color.

Production of inorganic high molecular weight carbon fluoride is carried out by reacting raw material carbon such as, for example, petroleum coke, coal coke, natural graphite, synthetic graphite, charcoal, carbon black, and binder carbon, either singly or in mixture, with fluorine. (For more concrete method for production, refer to "CERAMIC", 4 (4), 301 (1969); "DENKI KAGAKU" (ELECTRO-CHEMISTRY), 31, 756 (1963); Ibid., 35, 19 (1967).)

For the inorganic high molecular weight carbon fluoride to be used in the present invention, those having a higher rate of fluorination, hence higher degree of whiteness, are preferable as the recording material. In practice, those having the rate of fluorination or higher than 40% (i.e. $x = 0.4$ and above in the afore-described general formula $(CF_x)_n$) are sufficient for the purpose of the present invention.

The quantity of the inorganic high molecular weight carbon fluoride employed is such that, as the quantity increases, the image density augments and blackens at the same time resistance at the recording layer increases so as to be liable to cause an electric discharge at the time of the image recording with the consequent deterioration in the image to be reproduced and lowering of the resolution. In view of this, therefore, it is preferable to set the range of the quantity of the carbon fluoride to be employed below 50 parts by weight with respect to 100 parts by weight of the substance mainly exhibiting the ionic conduction, or more preferably, in the range of from 30 to 10 parts by weight.

The composition thus prepared is applied onto the substrate already coated with a thin metal layer to a thickness of from 5 to 20 microns, or, more particularly, from 6 to 10 microns, after drying.

Figure 3:
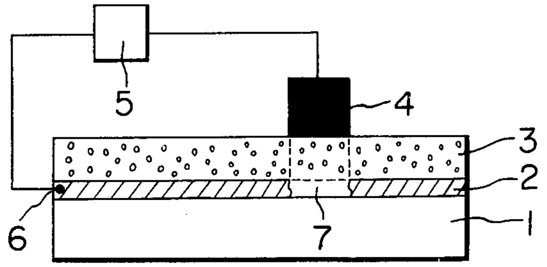

When the electric conduction is performed, as schematically shown in FIG. 3, on the image recording member manufactured in the afore-described manner, the member develops a color tone in black or blackish brown with the contrast between the conducting portion and the non-conducting portion reaching 0.8 to 1.0. It should also be particularly noted that, when application of electric current is carried out, the thin metal layer beneath the stylus 4 immediately disappears in a very sharp form as shown in FIG. 3, where it is shown with a reference numeral 17. Moreover, this sharply perforated portion in the thin metal layer is not formed in an irregular form as the result of both the recording layer and electrically conductive layer being splashed out by generation of sparks, as in the case of carrying out the electric current conduction directly onto a conventional electric discharge recording paper, or a recording layer consisting of a semiconductor substance in general and a binding agent, or a thin metal layer. The thin metal layer alone disappears in a very sharp point in accordance with electrical signals without causing any perforation or deterioration to the recording layer coated on the thin metal layer.

In the present invention, unlike the conventional recording material, there is contained no component of the so-called "color forming agent", in the constituent of the image recording member. Therefore, the image forming mechanism cannot be properly explained by the known forming mechanism, hence it is left for further clarification. However, from various facts which have so far been ascertained, it can be inferred that, as at least one factor in the image formation, anodic oxidation should take place in the thin metal layer. These facts indicate that an electrically conductive medium mainly showing ionic conduction should be used in constructing the recording layer, that this conductive medium should be directly contacted with the thin metal layer, that the anodic dependency of the current is recognized at the time of the recording, and the recording efficiency reaches its maximum when the thin metal layer is connected to the positive polarity, that corrosion or destruction corresponding to the recorded image pattern is recognized in the thin metal layer after the recording operation, that no image can be formed, even when a carbon layer is substituted for the thin metal layer, and others.

In the present invention, therefore, the thin metal layer plays a very important and unique role not only as the electrically conductive layer as seen in conventional electric conduction recording paper, but also in the image formation itself.

For the metal or metal ions isolated from the thin metal layer by the anodic oxidation to be the main cause for forming the color forming component, there should exist solid particles capable of adsorbing to the image recording layer. Accordingly, the substance mainly exhibiting the ionic conduction for use in the present invention should be virtually insoluble in the solvent or binding agent to be used at the time of constructing the recording layer, and should be uniformly dispersed in the recording layer in the form of very fine particles. In such color forming mechanism as inferred in the foregoing, it is also not clear why the color forming density remarkably increases by the presence of the oxygen acid radical of boron. In this connection, it is assumed that, since the oxygen acid of boron or its salts are electrolytic, the addition thereof would improve the electric conductivity of the recording layer, thereby increasing the color forming efficiency. However, as this increased effort can be seen particularly only in the case of using the oxygen acid of boron or its salts, it may be adequate to consider that the unique effect given by the aforementioned anodic oxidation or catalytic function at the time of the color forming action would contribute to improvement in density of the recorded image.

The layer 3 according to the present invention has primarily not so great a masking function, but aids increasing the degree of whiteness upon its coating onto the thin metal layer. Accordingly, the portion of the thin metal layer vanishing as the result of the electric current application is recognized to have unexpectedly color-formed, and, at the same time, to have formed a very sharp light permeating portion, in contrast to the very high light impermeability at the non-conducted portion thereof. The light permeating or transmitting portion exhibiting in the pure white, non-transparent portion thus formed still possesses sufficient contrast even as the reflective image. Also, while the light transmission at the non-conducted portion is 0%, the light transmission at the conducted part amounts to 60 to 70%, so that, when the image recording member of the present invention which has been subjected to the image recording by the electric conduction is closely contacted with a photosensitive sheet such as diazo-photosensitive material, silver salt photo-sensitive material, free radical photosensitive resin, and so forth, then the recording member is subjected to light exposure, there is reproduced a portion corresponding to the electrically conducted portion on this photosensitive sheet, whereby the image reproduction can be performed very easily.

By reversing electrical signals corresponding to the black level and white level of an original image to be reproduced in the device for carrying out the electric conduction such as, for example, an electrical stencil preparing machine, facsimile receiver, printer-recorder, and so on, it is possible to produce a second original image in either negative or positive form from one and the same original image. Therefore, irrespective of the kind of the reproduction system to be employed for the original image and the second process step, a final positive image can always be obtained.

While this contrast in the light transmission is sufficient for the purpose of the ordinary diazo-reproduction, etc., when it is desired to further increase this contrast, paraffin which softens at a low temperature or becomes molten to reduce light scattering of the recording layer per se, or phenols having a softening point of from 50° to 180° C and of low crystallinity, or low polymers thereof, resins, etc. may be mixed into the layer 3 in a pulverized form. When the layer 3 of the image recording layer is rinsed with water after the electric conduction, there can be obtained a metal pattern sheet, wherein the thin metal layer having a mirror surface is left at the non-conducted portion and the transparent substrate is exposed in a very sharp and discrete configuration at the conducted portion. As an example, when a Mylar film ("Mylar" is a trademark for polyester film produced and sold by E. I. DuPont de Nemour & Co., U.S.A.) is used as the substrate, the light transmission at the conducted part ranges from 95 to 100%, while the light transmission at the non-conducted part ranges from 0 to 2%, whereby a metal pattern sheet of very high light transmission and very sharp image contrast can be obtained. This kind of pattern sheet can therefore be used as, for example, transparency for an overhead projector. The image reproducibility of this metal pattern sheet is so truthful to the original image that even very fine portions thereof can be reproduced exactly, hence this substitutes for the conventional metal pattern sheet which has been manufactured by the etching method using very harmful chemicals. That is to say, by utilizing the difference in the hydrophilic property between the substrate and the thin metal layer, this pattern sheet can also find its use as master sheet for offset printing, electrical wiring base material such as printed circuit, or ornamental pattern sheet such as a label, in which the mirror surface of the thin metal layer is taken advantage of.

PREFERRED EXAMPLES

In order to enable those persons skilled in the art to reduce the present invention into practice, the following preferred examples are presented. It should, however, be noted that these examples are illustrative only, and not restrictive, and that any change and modification may be made in the component parts to be used to construct the recording member within the ambit of the present invention as recited in the appended claims.

EXAMPLE 1

A slurry is first prepared by dispersing 150 gr. of zeolite ("Molecular sieve A (3A)", product of Union-Showa Kabushiki Kaisha, Japan) in 160 gr. of water in a ball mill for full one day and night. Into this slurry, there is added 300 gr. of 5% aqueous solution of sodium alginate ("Duck Algin NSPLL", product of Kamogawa Kasei Kogyo K.K., Japan) and mixed sufficiently to prepare a coating liquid. This coating material is then applied by use of a coating rod on the smooth surface of a thin leafy base paper having an anti-oil permeating property and having on its surface an anchoring resin layer and an vacuum-evaporated aluminum layer thereover in a thickness of 150 mg/m$^2$ or so, and dried sufficiently. The thickness of this initial coated film is such that it may be 7 to 8 microns after drying.

The thus prepared image recording paper is extremely high in its whiteness, possesses a touch or feeling rich in naturality, and is entirely stable against fogging, etc. with lapse of time. With this recording paper, when the image recording is conducted by a recording stylus running at 0.7 m/sec. at an impressed voltage of $-200$V and current of 30 mA, a dark brown image can be recorded with very sharp and high resolution in the environmental conditions perfectly free from bad smell, smoke, and dust during the recording operation.

Next, the abovementioned zeolite (Molecular sieve A) is replaced by the below-listed various zeolites, and the recording sheets are manufactured in exactly the same way as described in the foregoing. When these recording sheets are subjected to the image recording by the electric conduction, images of sharp color tone as indicated in the following Table 1 are obtained.

Table 1

| Zeolite Used | Color Tone of Image |
|---|---|
| Molecular sieve SK-40 (Y-type) (product of Union Carbide Corp., U.S.A.) | Khaki |
| Molecular sieve Na Y (Y-type) (product of Shokubai Kasei Kogyo K.K., Japan) | Blackish brown |
| Molecular sieve 13X (Y-type) (product of Union-Showa K.K., Japan) | Grey |
| Zeolum (synthetic zeolite of K.K. Tekkosha, Japan) | Grey |
| Weddellite | Light grey |
| Gismondite | " |
| Chabazite | " |
| Scorodite | " |
| Clinoptilotite | " |
| Mordenite | " |
| Analcite | " |

EXAMPLE 2

A slurry is prepared by dispersing 150 gr. of Molecular sieve A (3A) (product of Union-Showa K.K., Japan) in 160 gr. of water in a ball mill for full one day and night. The thus obtained slurry is then combined with the below-listed various binders in the same manner as in Example 1 above to prepare image recording sheets. Each of these recording sheets is thereafter subjected to the image recording operation also in the same manner as in Example 1. Recordability and color tone of the recorded image are as shown in Table 2 below.

Table 2

| Binder | Recordability | Color Tone |
|---|---|---|
| Oxidized starch | Fair | Light grey |
| Cation starch | Excellent | Grey |
| Casein | Fair | Light grey |
| PVA | Fair | Light grey |
| C.M.C. | Excellent | Khaki |
| Sodium polyacrylate | Excellent | Light grey |
| Sodium alginate | Excellent | Dark brown |
| Propylene glycol alginate | Excellent | Dark brown |
| Ammonium alginate | Excellent | Dark brown |
| Polyvinyl butyral (alcohol solution) | Fair | Light grey |
| Styrene-butadiene copolymer latex | Fair | Light grey |
| Acryl latex | Fair | Light grey |

EXAMPLE 3

A slurry is prepared by dispersing 50 gr. of Molecular sieve A (3A) (product of Union-Showa K.K., Japan) in 60 gr. of water in a ball mill for full 1 day and night. Into this slurry, there is added 20 gr. of sodium polyacrylate ("Aron 20L", product of Toa Gosei Kagaku K.K., Japan) and mixed sufficiently to obtain a coating liquid. This coating material is then applied by use of coating rod to the smooth surface of a base Mylar film 50 microns thick having thereon vacuum-evaporated an aluminum layer of 100 mg/m$^2$ or so in thickness, and dried with hot blowing air of 100° C or so. Thickness of this coating film is such that it may be 6 to 8 microns after the drying.

The thus prepared image recording paper is extremely high in its whiteness, and is entirely stable against quality changes with lapse of time.

This recording sheet is then subjected to the recording operation by application of electric current through a tungsten recording stylus with an impressed voltage of −150V to −200V and a constant current controlling value of 25 mA to 30 mA. The recording apparatus used is a modified type of "Toshafax SH-600" (an electric discharge recording appartus produced by Tokyo Koku Keiki K.K., Japan). The scanning speed of the stylus is from 0.7 to 1.5 m/sec.. During the recording operation, half of the original image is subjected to positive-positive recording, and the remaining half thereof is subjected negative-positive recording by reversing electrical signal through a change-over switch for negative-positive recording installed in the recording apparatus. The image thus recorded is found to be very truthful to the original image and to have high resolution. It is also noted that there has been no undesirable smell, smoke and, scattering of dusts during the recording operation. The resultant image is such that the former half is a light transmitting negative image, and the latter half is a positive image having a light transmitting background. While this recorded image possesses sufficient reflective contrast as the visible image, it has also the light transmission of 60% in the transparent portion, and 0% in the non-transparent portion. Therefore, when this image recording sheet is overlayed on a diazo-image reproduction paper, and subjected to exposure by transmitting light, and subsequently developed, there can be obtained a beautiful diazo-copy having a negative image for its former half, where the white portion clearly comes out, and a positive image for the latter half thereof.

Separately, when the image recording paper prepared by using the below-listed zeolites, zeolite-like compounds, and solid electrolytes in place of the above-mentioned Molecular sieve A (3A) are subjected to the image recording operation in the same manner as described above, the results as shown in the following Table 3 are obtained.

Table 3

| Zeolites, etc. Used. | Manufacturer | Polarity | Recordability | Light transmission at the conducted portion |
|---|---|---|---|---|
| Synthetic zeolite Y | U.C.C. | — | ** | 65% |
| Synthetic zeolite 13X | Union-Showa | — | ** | 70% |
| Weddellite | Occurring in nature | AC | * | 40% |
| Gismondite | " | AC | * | 40% |
| Chabazite | " | AC | ** | 55% |
| Scorodite | " | — | * | 30% |
| Clinoptilotite | " | — | * | 30% |
| Mordenite | " | — | * | 45% |
| Alalcite | " | — | ** | 50% |
| β-alumina | Toshiba Ceramics | AC | ** | 65% |
| $RbAg_4I_5$ | synthesized from reagent | — | ** | 60% |
| α-CuBr | " | AC | ** | 40% |

(NOTE)
In the column "recordability":
symbol "**" denotes very sharp image; and
symbol "*" denotes that image obtained shows slight tendency of destruction due to electric discharge.

EXAMPLE 4

The exact procedures as set forth in Example 3 above are followed in preparing a recording sheet, except for substitution of sodium polyacrylate for the below-listed various binders. The thus obtained recording sheets are then subjected to image recording tests with the results as shown in the following Table 4.

Table 4

| Binder | Manufacturer | Recordability | Light transmission |
|---|---|---|---|
| Oxidized starch | Oji-National | * | 40% |

Table 4-continued

| Binder | Manufacturer | Recordability | Light transmission |
|---|---|---|---|
| Copolymer of methyl vinyl ether and butyl monoester of maleic anhydride | G.A.F. | ** | 75% |
| Sodium alginate | Kamogawa Kasei K.K. | ** | 55% |
| Casein | — | * | 30% |
| PVA | Shinetsu Kagaku Kogyo K.K. | * | 30% |
| CMC | — | ** | 60% |
| Polyvinyl butyral | G.A.F. | * | 50% |
| Acryl latex | Toa Gosei K.K. | ** | 65% |
| Cation starch | Oji-National | ** | 65% |

(Note)
In the column "recordability":
symbol "**"denotes very sharp image; and
symbol "*" denotes that image obtained shows slight tendency of destruction due to electric discharge.

EXAMPLE 5

A slurry is prepared by dispersing 40 gr. of "Zeolum", a 13X type synthetic zeolite produced by K.K. Tekkosha, Japan, in 60 gr. of methanol in a ball mill for full one day and night. To this slurry thus prepared, there is added 12 gr. of "Gantrez ES-425" (a trademark for an interpolymer of methyl vinyl ether and it is then maleic anhydride produced by G.A.F., USA) and well mixed. The obtained coating mixture is then applied by means of a coating rod on the surface of a Mylar film (a trademark for a polyester film produced by E. I. Du-Pont de Nemour & Co., USA) having thereon an evaporatively deposited aluminum layer 50 microns thick to provide a film thickness of 7 g/m$^2$. Then, this zeolite-coated recording sheet is subjected to overall negative-reversal recording, wherein the background is electrically conducted in the same manner as in Example 3. Thereafter, the recording layer is rinsed with water to obtain a metal pattern sheet which is highly faithful to the original image. This metal pattern sheet possesses a light transmission of 0% at the metal pattern portion, and 95% at the background portion. When this metal pattern sheet is used as the transparency for the overhead projector, images of very high resolution can be obtained.

EXAMPLE 6

The electrically sensitive recording paper prepared in the same manner as in Example 5 above is subjected to the recording operation by receiving a facsimile image using Tokofax, a recording apparatus manufactured by Tokyo Koku Keiki K.K., Japan. While this recorded image on this recording paper can be used as a recording member having a visible image, it can also be treated in the diazo-reproduction apparatus for obtaining multi-copies as in Example 3. Further, when a great many copies are to be reproduced, the recording layer is rinsed with water and then treated with etching solution so as to be adapted to a small-sized off-set printing machine, then approximately 500 sheets of faithfully reproduced copies can be obtained at low cost. Thus, the image recording sheet of this example is very convenient for distributing multi-copies of information at a receiving region remote from the source of information.

EXAMPLE 7

A slurry is prepared by dispersing 150 gr. of Molecular sieve A (3A) (product of Union-Showa K.K.) in 160 gr. of water in a ball mill for full one day and night. To the thus obtained slurry, there is added 300 gr. of 5% aqueous solution of sodium alginate "Duck Algin NSPLL" (product of Kamogawa Kasei Kogyo K.K., Japan), and the resulting slurry is mixed to obtain a coating mixture. Thereafter, this coating by means of a coating rod material is coated on a smooth surface of an anti-oil permeating thin leafy base paper having thereon a layer of anchoring resin and a vacuum-evaporated aluminum layer of 150 mg/m$^2$ in thickness, and then subjected to drying. Thickness of this coated layer is such that it may become 7 to 8 microns after drying.

On the other hand, a separate coating liquid is prepared by adding 15 gr. of boric acid (first grade reagent) to a liquid coating material, to which the aqueous binder of the abovementioned recipe has been added. This coating liquid is applied onto the base sheet and dried. The thus obtained recording paper is found to have very high degree of whiteness and touch abundant in naturality and to be perfectly stable against fogging and other undesirable effects with lapse of time.

When the abovementioned two kinds of image recording sheets are subjected to the image recording operations by applying voltage of $-200V$ and current of 30 mA through a stylus running at a recording speed of 0.7 m/sec, a very sharp image with high resolution can be recorded without issuance whatsoever of bad smell, smoke, and dust during the recording operations.

The image obtained from the recoring paper without addition of boric acid is dark brown in color with the paper reflection density of 0.60, while the image obtained from the recording paper formed with boric acid is blackish brown in color and has a reflection density of 0.85, which represents improved color tone and image contrast.

EXAMPLE 8

Various slurries are prepared by dispersing 150 gr. of each of the below-listed substances mainly exhibiting the ionic conduction, 15 gr. of antimony oxide, and 160 gr. of water in a ball mill for a full three days and nights. The thus obtained slurries are used to prepare the recording sheets in the same manner as in Example 7 above, after which these recording sheets are subjected to the image recording operation also in the same manner as in Example 7. The results obtained are as shown in the following Table 5.

Table 5

| Substances Mainly Exhibiting Ionic Conduction | Boric Acid Not Added | | Boric Acid Added | |
|---|---|---|---|---|
| | Color tone of Image | Reflection Density | Color Tone of Image | Reflection Density |
| Synthetic zeolite | Khaki | 0.55 | Blackish Brown | 0.75 |
| Synthetic zeolite 13X | Grey to dark brown | 0.60 | Blackish Brown | 0.80 |
| Weddellite | Light grey | 0.40 | Dark Brown | 0.50 |
| Gismondite | " | 0.30 | " | 0.50 |
| Chabazite | " | 0.35 | " | 0.50 |
| Scorodite | " | 0.35 | " | 0.45 |
| Clinoptilotite | " | 0.40 | " | 0.55 |
| Mordenite | " | 0.35 | " | 0.45 |
| Analcite | " | 0.45 | " | 0.60 |
| β-alumina | Brown | 0.60 Brown | Blackish Brown | 0.80 |
| $RbAg_4I_5$ | Dark brown | 0.60 | " | 0.75 |
| α-CuBr | Khaki | 0.50 | " | 0.75 |
| Ion-exchange resin of sodium polystyrene sulfonate type | Dark brown | 0.35 | " | 0.45 |
| Mont- | " | 0.50 | " | 0.75 |

Table 5-continued

| Substances Mainly Exhibiting Ionic Conduction | Boric Acid Not Added | | Boric Acid Added | |
|---|---|---|---|---|
| | Color tone of Image | Reflection Density | Color Tone of Image | Reflection Density |
| morillonite | | | | |
| Diatomaceous earth | " | 0.55 | " | 0.80 |

EXAMPLE 9

With the exception that antimony oxide used in the above Example 8 is substituted for zinc oxide, aluminum oxide, indium oxide, molybdenum oxide, and stannic oxide in the same quantity, the exactly same procedures as in Example 8 are followed. Substantially same results have been obtained.

EXAMPLE 10

The exact same procedures are followed in Example 7 to prepare the image recording paper with the exception that 150 gr. of Y-type Molecular sieve (SK-40) of Union Carbide Corp., USA, and 30 gr. of titanium oxide are well dispersed in 160 gr. of water in a ball mill for full three days and nights, and the below-listed various borates substitute for the same amount of boric acid used in Example 7.

For the sake of comparison, image recording sheets, wherein sodium borofluoride and diborane diamine as the other boron compounds having no oxygen acid radical are added to the coating liquid, have been produced. By using these various kinds of recording sheets, the image recording has been conducted under the exactly same operating conditions as in Example 7 to obtain the results in the following Table 6.

Table 6

| Boron Compound | Color Tone of Image | Reflection Density |
|---|---|---|
| — | Dark brown | 0.60 |
| Sodium borate | Blackish brown | 0.85 |
| Hydrogen ammonium borate | " | 0.80 |
| Potassium borate | " | 0.80 |
| Zinc borate | " | 0.80 |
| Sodium borofluoride | Brown | 0.60 |
| Diborane diamine | " | 0.60 |

EXAMPLE 11

A slurry is prepared by kneading a mixture of 102 gr. of 3A type synthetic zeolite (product of Union Carbide Corp., USA), 18 gr. of 13X type synthetic zeolite (product of Union Carbide Corp.,), 6 gr. of sodium silicate, 18 gr. of potassium borate, 30 gr. of inorganic high molecular weight carbon fluoride (raw material carbon: a mixture of binder carbon and coal coke at a mixing ratio of 5 to 1 by weight with a rate of fluorination of 100%), 11 gr. of sodium alginate ("Duck Algin NSPLL", product of Kamogawa Kasei Kogyo K.K., japan), 10 gr. of gum arabic, and 590 gr. of water in a ball mill for full three days and nights. The thus obtained slurry is then coated on a base paper having thereon vapor-deposited aluminum layer by use of a coating rod, and then dried. The thickness of the coating layer is such that it becomes 10 microns after the drying.

Subsequently, the aluminum layer of the recording paper is connected to a source of positive polarity and a tungsten stylus of 0.2 mm in diameter is connected to a source of negative polarity so as to cause the stylus to scan on the surface of the coated layer at a speed of 50 cm/sec., while an electric voltage of approximately 200 volts is applied.

As the result of the scanning, the portions contacted by the scanning stylus have developed black color and the density of the developed areas is 1.0.

For the sake of comparison, the inorganic high molecular weight carbon fluoride alone is removed from the abovementioned recipe for the coating liquid, and another recording sheet is prepared in exactly the same manner as above and subjected to the scanning by the stylus under the same recording conditions. The image obtained as the result is blackish brown in color, and has a density of 0.8.

We claim:

1. An electrosensitive recording member comprising a support and a recording layer on the support, said recording layer including a image forming layer comprising a thin metal layer, and a second layer comprising a binding material and an ion conducting solid material said second layer does not deteriorate electrolytically, react or perforate upon disappearance of the thin metal layer upon recording, said ion conducting solid material being uniformly dispersed in said binding material.

2. The electrosensitive recording member of claim 1 wherein the second layer further contains the compound selected from the group consisting of oxygen acid of boron, and salts thereof.

3. The electrosensitive recording member of claim 2 wherein the second layer additionally contains a metal compound.

4. The electrosensitive recording member of claim 2 wherein the second layer additionally contains inorganic high molecular weight carbon fluoride.

5. The electrosensitive recording member of claim 2 wherein the second layer additionally contains a metal compound and an inorganic high molecular weight carbon fluoride.

6. The electrosensitive recording member of claim 1 wherein the supports consists of light transmitting material.

7. The electrosensitive recording member of claim 1 wherein the thin metal layer is selected from the group consisting of aluminum, silver, zinc, copper, nickel, chromium, and tungsten.

8. The electrosensitive recording member of claim 1 wherein the thin metal layer is a vapour-deposited film of a metal selected from the group consisting of aluminum, silver, zinc, copper, nickel, chromium, and tungsten.

9. The electrosensitive recording member of claim 1 wherein the binding material used in the second layer is a high molecular polymeric material containing in its molecular structure a substance selected from the group consisting of a residual radical of a carboxylic acid and a salt thereof.

10. The electrosensitive recording member of claim 1 wherein the ion conducting solid material is a compound containing zeolitic water.

11. The electrosensitive recording member of claim 1 wherein the ion conducting solid material is a solid electrolyte which does not deteriorate, react or perforate upon disappearance of the thin metal layer upon recording.

12. The electrosensitive recording member of claim 1 wherein the ion conducting material is an ion-exchange resin.

13. The electrosensitive recording member of claim 1 wherein the ion conducting solid material is a silicate.

14. The electrosensitive recording member of claim 1 wherein the thickness of the thin metal layer is from 50 to 2000 angstroms.

15. The electrosensitive image recording member of claim 1 wherein the weight ratio of said ion conducting solid material to said binding material is from 3:1 to 5:1.

16. The electrosensitive image recording member of claim 1 wherein the weight ratio of the ion conducting solid material to the binding material 5:1 to 10:1.

17. The electrosensitive image recording member of claim 2 wherein the weight ratio of the oxygen acid radical of boron and the ion conducting solid material is from 1:4 to 1:20.

18. The electrosensitive image recording member of claim 1 wherein the second layer has a dried film thickness from 5 to 20 microns.

19. The electrosensitive image recording member of claim 1 wherein the second layer has a dried film thickness from 6 to 10 microns.

20. The electrosensitive image recording member of claim 1 wherein at least two kinds of said ion conducting solid material are employed in the second layer.

21. The electrosensitive image recording member of claim 3 wherein the metal compound is selected from the group consisting of titanium oxide, zinc oxide, antimony trioxide, antimony pentoxide, magnesium oxide, stannous oxide, indium oxide, molybdenum oxide, magnesium oxide, zinc hydroxide, bismuth oxide, and tantalum pentoxide and mixtures thereof.

22. A recording method by electric conduction which comprises conducting electric current through an electrosensitive recording member having a recording layer laminated to a support layer, said recording layer including an image forming layer comprising a thin metal layer and a second layer comprising a binding material and an ion conducting solid material, said second layer does not deteriorate, electrolytically react or perforate upon disappearance of the thin metal layer upon recording, said ion conducting solid material uniformly dispersed in said binding material.

23. The image recording method of claim 22 wherein the second layer additionally contains material selected from the group consisting of oxygen acid of boron and a salt thereof.

24. The image recording method of claim 22 including conducting electric current to said recording layer by means of a recording needle or stylus.

25. The image recording method of claim 22 including forming a color image.

26. The image recording method of claim 22 including forming a light transmitting image with a light impervious part as a background thereof.

* * * * *

UNITED STATES PATENT AND TRADEMARK OFFICE

CERTIFICATE OF CORRECTION

PATENT NO. : 4,067,780

DATED : January 10, 1978

INVENTOR(S) : Takutoshi Fujiwara, et al.

It is certified that error appears in the above-identified patent and that said Letters Patent are hereby corrected as shown below:

Column 1, line 55, change "which" to --this--
Column 1, line 55, change "caused" to --cause--
Column 1, line 64, change "formed" to --forming--
Column 2, line 58, delete "of" first occurrence
Column 2, line 64, change "other" to --another--
Column 2, line 67, change "other" to --another--

Column 5, line 15, change "aluminosilicate" to
--aluminosilicates--
Column 5, line 16, change "is" to --are--
Column 5, line 42, change "for" to --by--
Column 5, line 54, in group 2 in formula, change
"$xH_{20}$" to --$xH_2O$--
Column 6, line 9, change "$4H_2P$" to --$4H_2O$--
Column 6, line 15, change "Zedon" to --Zeolon--
Column 7, line 4, insert --$NO^+$-- after "$H_3O^+$"
Column 7, line 16, change "θ" to --β--
Column 10, line 19, change "17" to --7--
Column 11, line 35, change "photo-sensitive" to
--photosensitive--
Column 15, line 26, delete the phrase "it is then"
after "and"
Column 15, line 27, insert --it is then-- after "and"
Column 16, line 4, insert --well-- before "mixed"

UNITED STATES PATENT AND TRADEMARK OFFICE
CERTIFICATE OF CORRECTION

PATENT NO. : 4,067,780

DATED : January 10, 1978

INVENTOR(S) : Takutoshi Fujiwara, et al.

It is certified that error appears in the above-identified patent and that said Letters Patent are hereby corrected as shown below:

Column 16, lines 5-6, delete phrase "by means of a coating rod" after "coating"
Column 16, line 6, insert --by means of a coating rod-- after "coated"
Column 16, line 10, insert --The-- before "Thickness"
Column 16, line 19, insert --is found-- after "and" first occurrence
Column 16, line 62, in table 5, third column, delete "Brown"
Column 17, line 20, change "exact" to --exactly--
Column 17, line 34, change "actly" to --act--
Column 19, line 11, claim 15, change "5:1" to --15:1--

Signed and Sealed this

*Eighth* Day of *August 1978*

[SEAL]

*Attest:*

RUTH C. MASON
*Attesting Officer*

DONALD W. BANNER
*Commissioner of Patents and Trademarks*